United States Patent
Wada et al.

(10) Patent No.: US 11,700,346 B2
(45) Date of Patent: Jul. 11, 2023

(54) IMAGE PROCESSING APPARATUS, IMAGE PROCESSING METHOD, AND STORAGE MEDIUM FOR GENERATING PREVIEW IMAGE DATA TO BE DISPLAYED ON A DISPLAY

(71) Applicant: CANON KABUSHIKI KAISHA, Tokyo (JP)

(72) Inventors: Satoshi Wada, Machida (JP); Yuji Konno, Kawasaki (JP); Takeshi Yazawa, Kawasaki (JP); Naomi Yamamoto, Yokohama (JP); Kei Yoshizawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/910,739

(22) Filed: Jun. 24, 2020

(65) Prior Publication Data
US 2020/0412913 A1 Dec. 31, 2020

(30) Foreign Application Priority Data
Jun. 27, 2019 (JP) .................................. 2019-120451

(51) Int. Cl.
*G06F 3/12* (2006.01)
*H04N 1/60* (2006.01)
*H04N 1/409* (2006.01)
*H04N 1/40* (2006.01)

(52) U.S. Cl.
CPC ......... *H04N 1/6005* (2013.01); *G06F 3/1208* (2013.01); *G06F 3/1256* (2013.01); *H04N 1/40087* (2013.01); *H04N 1/4092* (2013.01); *H04N 1/6011* (2013.01)

(58) Field of Classification Search
None
See application file for complete search history.

(56) References Cited

U.S. PATENT DOCUMENTS

| 5,754,682 | A  | * | 5/1998  | Katoh    | G06T 5/009   |
|-----------|----|---|---------|----------|--------------|
|           |    |   |         |          | 348/227.1    |
| 11,069,321| B2 | * | 7/2021  | Chen     | G06T 7/0002  |
| 2009/0002545 | A1 | * | 1/2009  | Heinonen | H04N 9/735   |
|           |    |   |         |          | 348/370      |
| 2017/0083767 | A1 | * | 3/2017  | Qian     | G06K 9/4604  |
| 2017/0272690 | A1 | * | 9/2017  | Seifi    | G06T 5/009   |
| 2017/0330312 | A1 | * | 11/2017 | Nam      | H04N 5/202   |
| 2019/0172419 | A1 | * | 6/2019  | Hwang    | G06T 5/009   |
| 2020/0007717 | A1 | * | 1/2020  | Suwa     | H04N 1/6086  |
| 2020/0272374 | A1 | * | 8/2020  | Kawai    | H04N 1/6088  |

FOREIGN PATENT DOCUMENTS

JP 2009-130461 A 6/2009

* cited by examiner

*Primary Examiner* — Barbara D Reinier
(74) *Attorney, Agent, or Firm* — Canon U.S.A., Inc. IP Division

(57) ABSTRACT

Luminance data indicating luminance of the print product illuminated by the lighting is calculated and processing for causing a high luminance region to have gradation characteristics is performed.

21 Claims, 16 Drawing Sheets

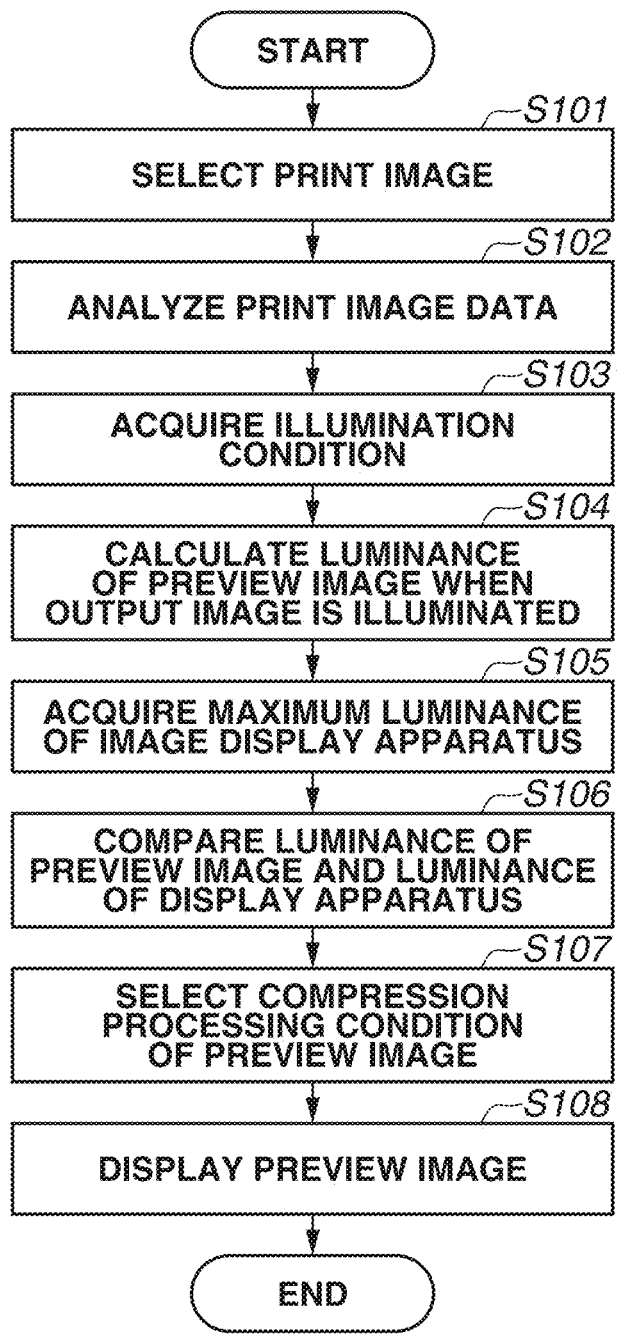

FIG.10

| MANUFACTURER NAME | MODEL NAME | MAXIMUM LUMINANCE (cd/m$^2$) |
|---|---|---|
| COMPANY A | A-XXX | 100 |
| | A-YYY | 200 |
| | A-ZZZ | 300 |
| | A-WWW | 400 |
| COMPANY B | B-WW | 200 |
| | B-YY | 400 |
| | B-XX | 500 |
| COMPANY C | C-X | 200 |
| | C-Y | 300 |
| | C-Z | 500 |
| COMPANY D | D-XXY | 300 |
| | D-YY-W | 400 |
| | D-ZZ-W | 500 |
| | D-WW-X | 600 |

IMAGE PROCESSING APPARATUS, IMAGE PROCESSING METHOD, AND STORAGE MEDIUM FOR GENERATING PREVIEW IMAGE DATA TO BE DISPLAYED ON A DISPLAY

BACKGROUND OF THE INVENTION

Field of the Invention

The present invention relates to an image processing apparatus that performs image processing for causing an image display apparatus to display an image, an image processing method, and a storage medium.

Description of the Related Art

Image recording apparatuses, such as a digital copy machine, a printer, and a facsimile machine using various print methods, such as an ink-jet method, electrophotography, and a thermal transfer method, have come into widespread use. Such an image recording apparatus performs image processing on input image data using an image processing unit incorporated in the apparatus or software that comes with the apparatus, and then outputs an image on a recording medium. If the apparatus is a printer, software called a printer driver is used. The printer driver described here indicates software having a function to configure various settings for image quality related to print, and a type and size of a recording medium when an image serving as a print (recording) target is selected, and then instruct the main body of the printer to perform print. The printer driver typically has a function to display a preview image of a printed image on an image display apparatus connected with to the printer. This function allows a user to confirm an image of an output image to be acquired by set print conditions before the image is actually printed on the recording medium.

A description will be given of a case in which a print product acquired by printing the image on the recording medium is illuminated by auxiliary lighting other than lighting of a room. Examples of the auxiliary lighting include spot lighting used for a photo exhibition. Exhibiting the print product by illuminating the print product with the auxiliary lighting can widen a luminance dynamic range of the image printed on the recording medium such as non-luminous paper. In the present specification, the image, the luminance dynamic range of which is widened by being illuminated with lighting is referred to as an "illuminated image".

Japanese Patent Application Laid-Open No. 2009-130461 discusses a technology of providing a condition input unit configured to accept an input of an illumination condition and an observation condition, and causing an image display apparatus to display a preview image of an illuminated image that satisfies the conditions.

In Japanese Patent Application Laid-Open No. 2009-130461, an image which has been obtained by simulating how the image appears based on previously examined data is displayed as a preview of the illuminated image, but performance of the image display apparatus is not taken into consideration in generation of image data for displaying a preview image. Examples of the performance of the image display apparatus include a luminance dynamic range and maximum luminance that can be output. If the above described performance of the image display apparatus is not taken into consideration, a preview image of the illuminated image exhibited by being illuminated with the auxiliary lighting may not be appropriately expressed. For example, when the illuminated image includes a high luminance region that has luminance exceeding the maximum luminance that can be output by the image display apparatus, a difference in luminance in the high luminance region is not expressed in the preview image of the illuminated image, and gradation is lost.

In order to solve the above-mentioned issue, the present invention is directed to appropriately display a preview image in consideration of a maximum luminance that can be output by an image display apparatus.

SUMMARY OF THE INVENTION

According to an aspect of the present invention, an image processing apparatus includes an acquisition unit configured to acquire a first value indicating a maximum luminance value of a print product illuminated by a lighting apparatus, and a second value indicating a maximum luminance value displayable by an image display apparatus; a generation unit configured to generate preview image data to be displayed on the image display apparatus by converting image data for printing the print product based on the first value and the second value that are acquired by the acquisition unit; and an output unit configured to output the preview image data generated by the generation unit to the image display apparatus, wherein, in a case where the first value is greater than the second value, a maximum luminance value of the preview image data generated by the generation unit is less than or equal to the second value so that a difference in luminance in a high luminance region can be expressed.

Further features of the present invention will become apparent from the following description of exemplary embodiments with reference to the attached drawings.

BRIEF DESCRIPTION OF THE DRAWINGS

FIG. 9 is a flowchart of preview display processing according to a first exemplary embodiment.

FIG. 10 illustrates table format data indicating a maximum luminance for each image display apparatus.

DESCRIPTION OF THE EMBODIMENTS

An exemplary embodiment of the present invention will be described with reference to the accompanying drawings. While a candela ($cd/m^2$) is used as a unit for luminance and light intensity, the unit is not limited thereto, and a lumen (lmn) and a lux (1×) may be used.

Figure 1A:
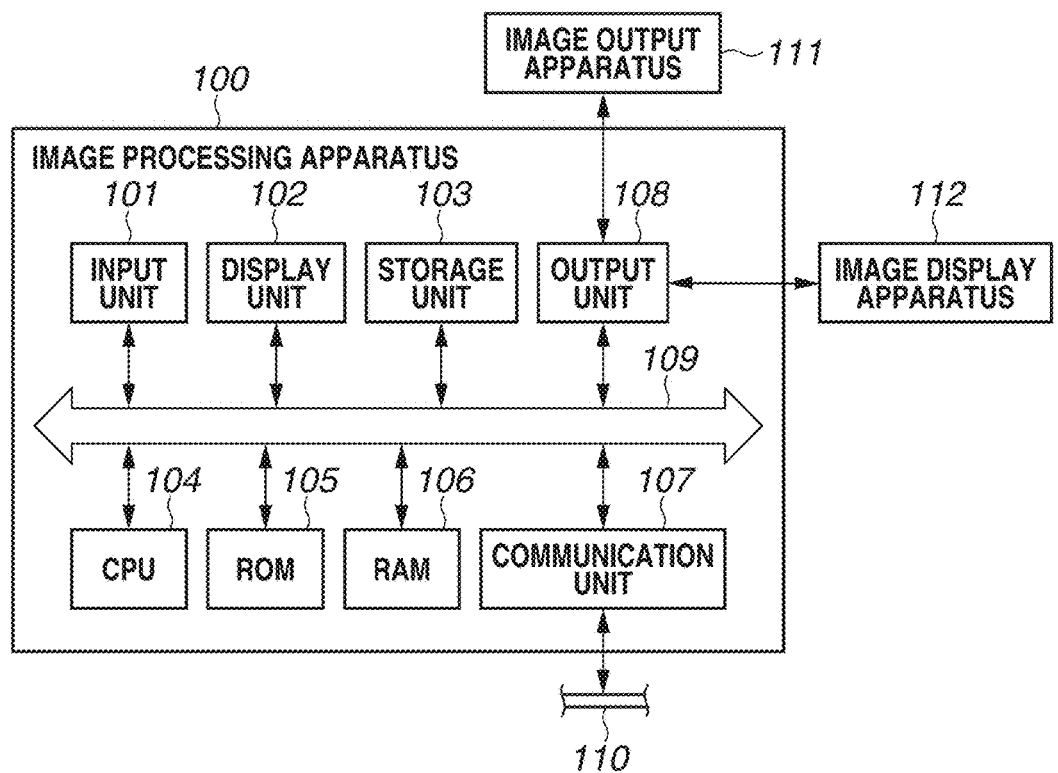
FIGS. 1A and 1B are block diagrams respectively illustrating a configuration of image processing apparatus and a configuration of an image output apparatus.

FIG. 1A is a diagram illustrating a configuration example of an image processing apparatus 100 according to the present exemplary embodiment. An image output apparatus 111 and an image display apparatus 112 are connected with the image processing apparatus 100. The image display apparatus 112 is assumed to be a liquid crystal monitor, a cathode-ray tube (CRT) monitor, or the like.

A central processing unit (CPU) 104 executes an operating system (OS) and various programs stored in a read-only memory (ROM) 105 or a storage unit 103 using a random-access memory (RAM) 106 as a work memory, and controls a configuration, which will be described below, through a system bus 109.

An input unit 101 is a serial bus interface, such as a universal serial bus (USB), and is connected with an input device such as a keyboard and a mouse, a memory card reader, and an image input device such as a digital camera and a scanner. The CPU 104 inputs, for example, a user's instruction and image data via the input unit 101, and causes a display unit 102, which is a monitor, to display a graphical user interface (GUI), an image, the progress of processing, a result, and the like.

The storage unit 103 is a storage medium such as a hard disk drive (HDD) and a solid state drive (SSD), in which a variety of programs and a variety of data are stored. Examples of the programs stored in the storage unit 103 include a program to achieve image processing, which will be described below.

A communication unit 107 is a network interface for connection with a wired or wireless network 110, such as an Ethernet® network, a Bluetooth® network, a Wireless Fidelity (Wi-Fi) network, and a peer-to-peer (P2P) network. An output unit 108 is a serial bus interface, such as a USB, and outputs image data or the like to an image output apparatus 111, the image display apparatus 112, and a memory card writer connected with a serial bus.

The CPU 104 communicates with a server apparatus and other computer apparatuses on the network 110 via the communication unit 107. The CPU 104 can receive a variety of programs and a variety of data from the server apparatus and other computer apparatuses on the network 110 to execute processing, and provide resultant data of the processing to the server apparatus and other computer apparatuses on the network 110. The computer apparatuses with which the CPU can communicate via the communication unit 107 also include the image output apparatus 111, and can output image data to the image output apparatus 111 and the image display apparatus 112.

The image processing apparatus 100 is achieved by providing a program for implementing image processing, which will be described below, to a computer apparatus, such as a personal computer, a tablet, and a smartphone. In a case where the tablet or the smartphone is used as the image processing apparatus 100, the input unit 101 and the display unit 102 may be stacked to constitute a touch panel. In this case, the display unit 102 can be considered to function also as the image display apparatus 112.

Figure 1B:
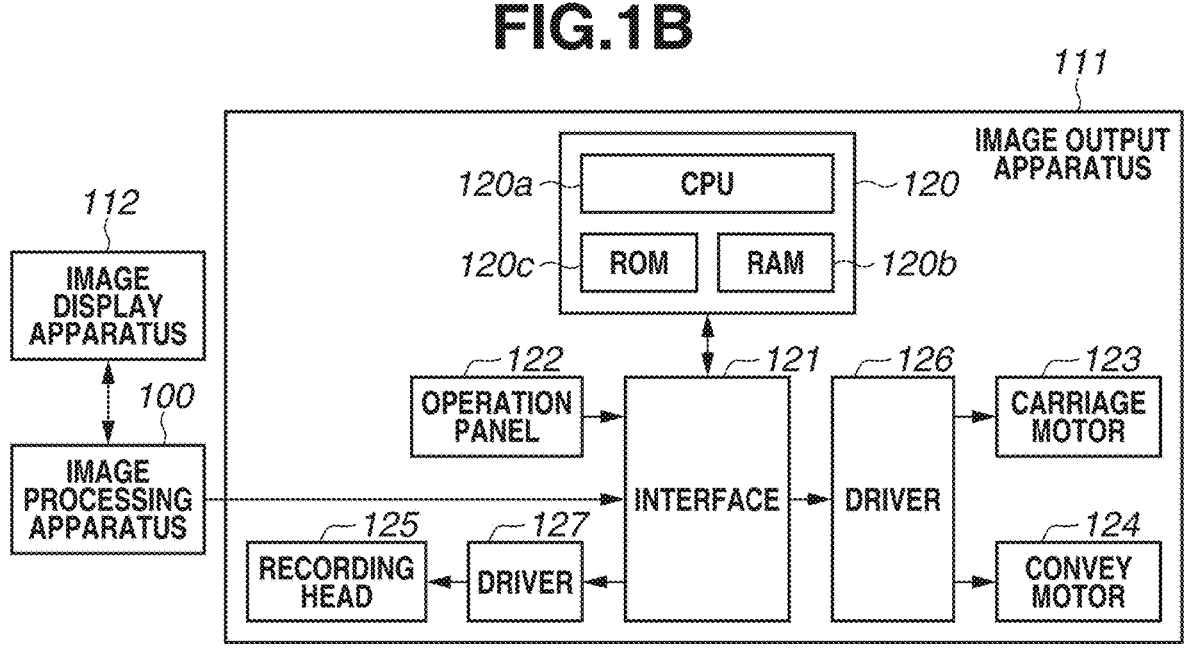

FIG. 1B is a block diagram illustrating a configuration example where the image output apparatus 111 is assumed to be an inkjet printer. The control unit 120 includes a CPU 120a such as a microprocessor, and a memory such as a RAM 120b and a ROM 120c. While the RAM 120b is used as a work area of the CPU 120a, it also serves, for example, as a storage to temporarily store a variety of data such as image data received from the image processing apparatus 100 and generated recording data. The ROM 120c stores a control program of the CPU 120a and parameters required for a recording operation.

The control unit 120 performs processing to input/output data and parameters used for recording image data or the like to and from the image processing apparatus 100 via an interface 121. The control unit 120 also performs processing to accept an input of a variety of information, such as a character pitch and a character type, from an operation panel 122. The control unit 120 outputs an ON signal or OFF signal for driving a carriage motor 123 and a convey motor 124 from a driver 126 via the interface 121. Further, the control unit 120 outputs a discharge signal or the like to a driver 127, and controls driving for discharging ink from a recording head 125. Each processing is executed by the control unit 120 reading a program stored in the RAM 120b.

FIGS. 1A and 1B each illustrate an example of an image processing system in which the image processing apparatus 100 and the image output apparatus 111 are separately configured, but the image processing system is not limited to the embodiment described above. An image forming apparatus in which the image processing apparatus 100 and the image output apparatus 111 are integrated may be employed. For example, an embodiment may be employed, in which the image processing apparatus 100 incorporates the configuration of the image output apparatus 111 to serve as printer driver software to control a printer. Further, the present exemplary embodiment can be applied to, for example, an image copy apparatus including an image reading device.

Figure 2:
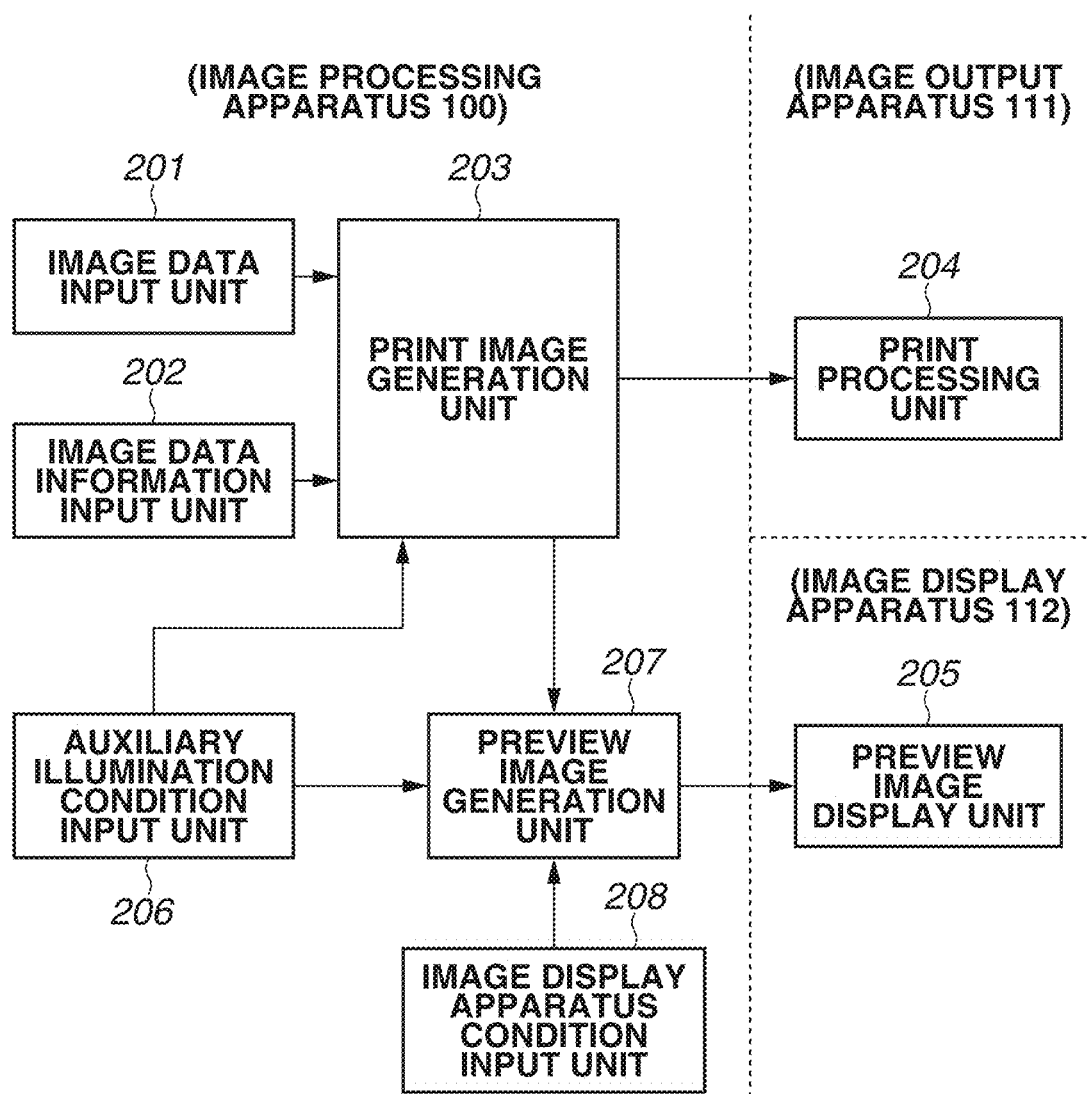
FIG. 2 is a block diagram illustrating a processing configuration example of the image processing apparatus and the image output apparatus.

FIG. 2 is a block diagram illustrating a processing configuration in a case where the image output apparatus 111 and the image display apparatus 112 are connected with the image processing apparatus 100 illustrated in FIGS. 1A and 1B. The processing configuration illustrated in FIG. 2 is achieved by supplying a program for implementing the processing configuration and its functions to the image processing apparatus 100 and executing the program.

Image data is input from a digital camera or the like via an image data input unit 201. At the same time, information at the time of image-capturing such as exposure condition information and image data information such as luminance dynamic range information is input via an image data information input unit 202. An auxiliary illumination condition input unit 206 acquires auxiliary illumination condition data about illumination light by a lighting apparatus. A print image generation unit 203 generates print data (output luminance data) for printing, based on the input image data, the image data information, and the auxiliary illumination condition data. The generated print data is transmitted to a print processing unit 204 in the image output apparatus 111. The image output apparatus 111 performs a variety of processing on the print data, and thereafter outputs a print product.

Meanwhile, a preview image generation unit 207 acquires the auxiliary illumination condition data acquired by the auxiliary illumination condition input unit 206, the print data generated by the print image generation unit 203, and display condition data acquired by an image display apparatus condition input unit 208. The preview image generation unit 207 then generates preview image data based on these pieces of information. The generated preview image data is transmitted to the image display apparatus 112, and is displayed on a preview image display unit 205.

Figure 3A:
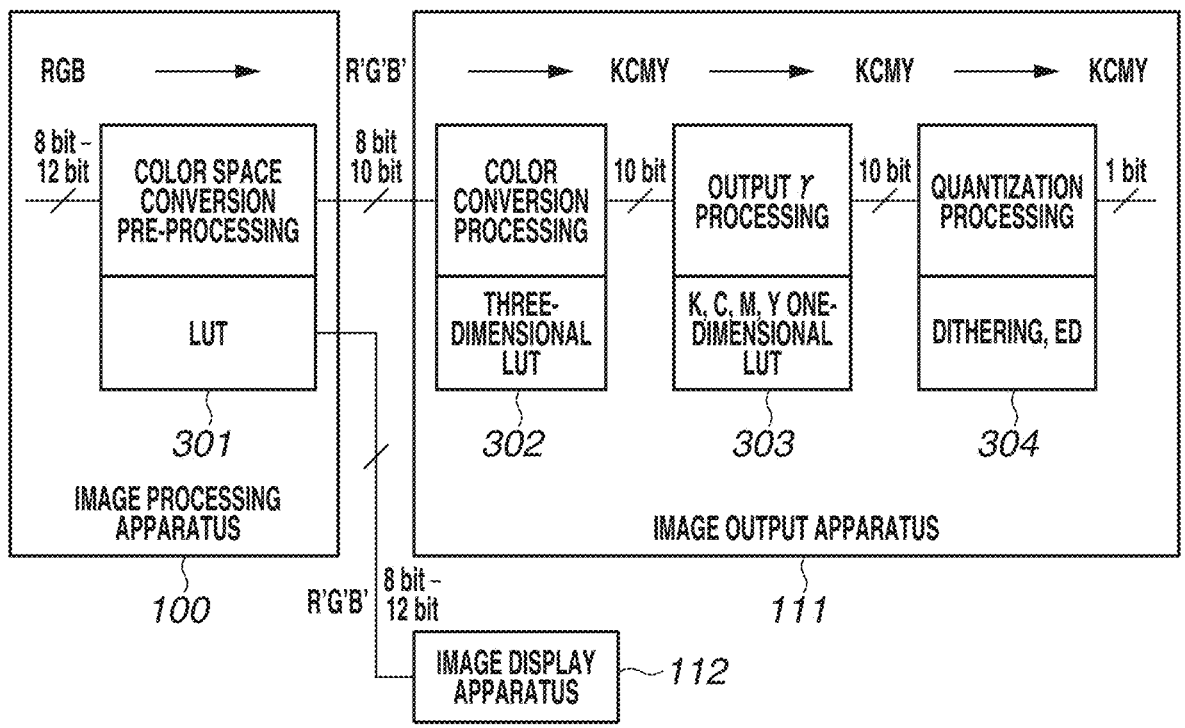
FIG. 3A is a block diagram illustrating an image processing flow and FIG. 3B is a graph illustrating a gamma curve.

FIG. 3A illustrates, assuming the image output apparatus 111 to be an inkjet printer, image processing for outputting color input image data on a recording medium. The print processing unit 204 of the image output apparatus 111 receives image data (luminance data) with each color of red (R), green (G), and blue (B) having 8 bits and 256 shades of gray, which is data of a typical image file such as Joint Photographic Experts Group (JPEG). After a plurality of processes are performed, the image output apparatus 111 finally outputs 1-bit image data (recording data) indicating whether discharge of ink droplets of each of black (K), cyan (C), magenta (M), and yellow (Y) is performed. These processes will be described below.

The image processing apparatus 100 receives input image data expressed by a luminance signal with each color of R, G, and B having 8 bits from a digital camera or the like. The image processing apparatus 100 then performs color space conversion pre-processing 301 on R, G, and B luminance signal data. The image processing apparatus 100 uses a three-dimensional look-up table (LUT) to convert the R, G, and B data to R', G', and B' data with each color having 8 bits or 10 bits. The color space conversion pre-processing 301 is performed to correct a difference between a color space expressed by the input R, G, and B image data and a color space that can be reproduced by the image output apparatus 111. Specifically, gamut mapping processing is performed, where color space conversion from RGB to XYZ is performed, then conversion from XYZ to R'G'B' is performed. This processing converts a gamut of the input data into a gamut that can be expressed by the printer. A luminance range of the input data, i.e., a Y component in XYZ data is converted to a luminance range that can be expressed by the image output apparatus 111. As a result, the luminance range that can be expressed by the image output apparatus 111 corresponds to a luminance range of the print product under standard lighting. This luminance range will be described in detail below.

Subsequently, data with each color of R', G', and B' having been subjected to the color space conversion pre-processing 301 and luminance conversion processing at the same time is transmitted from the image processing apparatus 100 to the image output apparatus 111. The image output apparatus 111 uses a three-dimensional LUT to perform color conversion processing 302 on the data with each color of R', G', and B', which has been subjected to the color space conversion pre-processing 301, to convert the data to data with each color of K, C, M, and Y having 10 bits. In the color conversion processing 302, RGB-based image data, which is input in the form of the luminance signal, is color-converted to ink color data corresponding to each ink of K, C, M, and Y used in the image output apparatus 111.

Figure 3B:
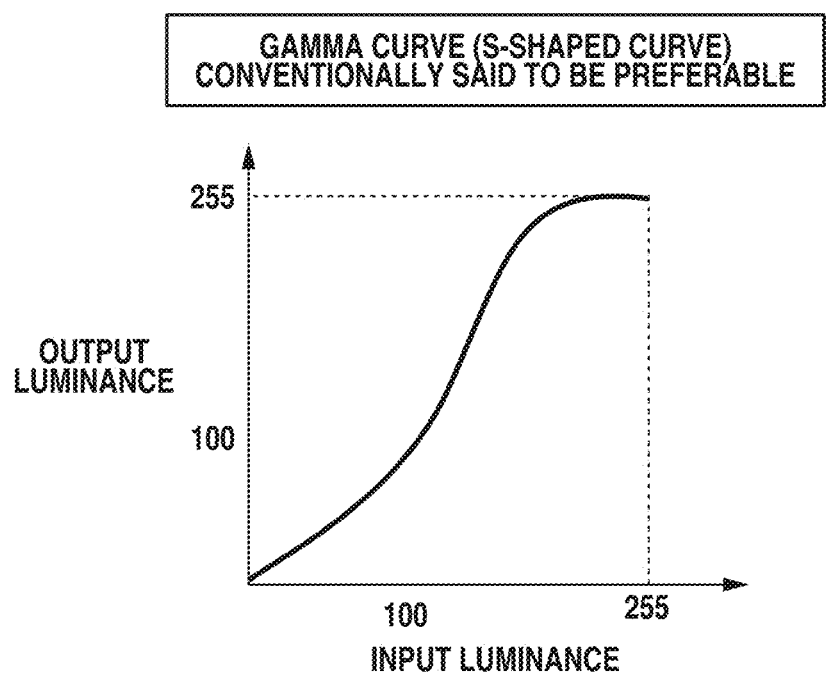

Subsequently, the image output apparatus 111 uses a one-dimensional LUT corresponding to each color to perform output Y processing 303 on the ink color data with each color of K, C, M, and Y having 10 bits, which has been subjected to the color conversion processing 302. FIG. 3B illustrates one example of a gamma curve (S-shaped curve Y) used in the output Y processing 303. Typically, a relationship between the number of ink droplets (dots) applied to a recording medium per unit area and recording characteristics such as a reflecting density acquired by measuring a recorded image is not a linear relationship. Thus, an input gray level of each of the four colors needs to be corrected such that the input gray level of each color of K, C, M, and Y having 10 bits and a density level of an image recorded with the input gray level have a linear relationship. That is, the purpose of the output Y processing 303 is to faithfully reproduce the input image data when the print product is output from the image output apparatus 111. Typically, even when the image output apparatus 111 performs linear processing on the input image data and outputs the processed data, a result of the print product and the input image do not have the linear relationship due to characteristics of a recording medium. This requires measurement of the characteristics of the recording medium to be used in advance, and design of the gamma curve to cause an input and an output to have the linear relationship.

Back to FIG. 3A, the image output apparatus 111 performs quantization processing 304 such as dithering and error diffusion (ED) processing on the ink color data having been subjected to the output Y processing 303. Specifically, with the quantization processing 304, the data of each color of K, C, M, and Y having 10 bits is converted to binary data of each color having 1 bit indicating discharge or non-discharge of ink droplets. The ink droplets are discharged from a recording head 125 based on the converted binary data, and the print product is output.

Figure 4:
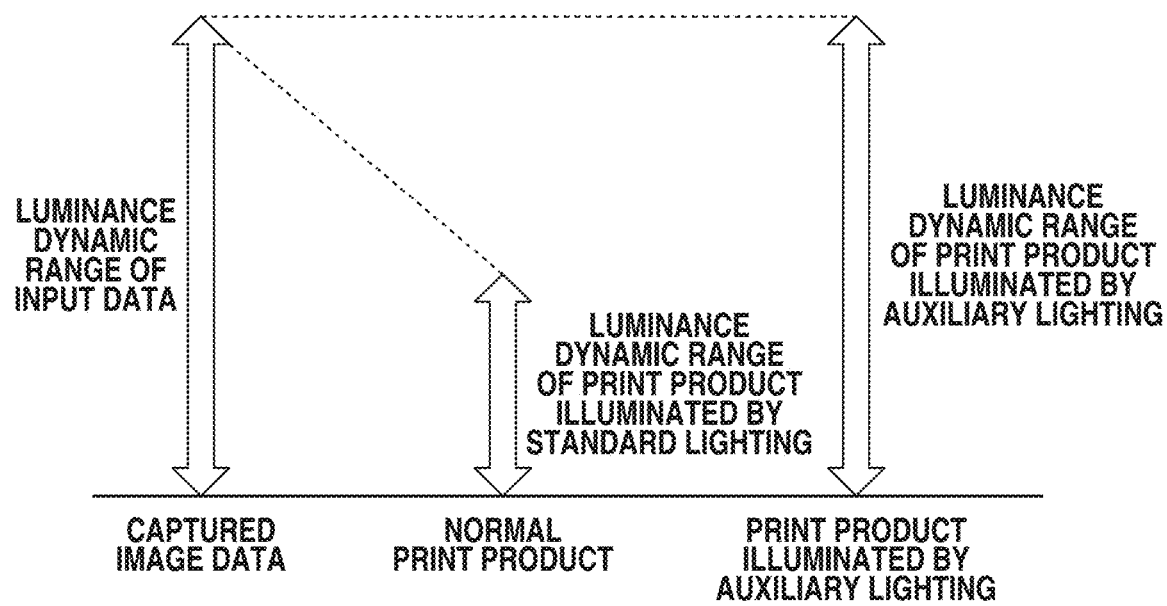
FIG. 4 is a diagram illustrating a luminance dynamic range.

FIG. 4 is a diagram illustrating a relationship of a luminance dynamic range. Typically, image data (raw image data) acquired by an image-capturing apparatus such as a digital camera is data having a wide luminance dynamic range. The image data is subjected to image processing in the image-capturing apparatus, and is stored as compressed imaged data (having 8 bits) such as JPEG data. In the inkjet printer, the JPEG data is mapped to a gamut range that can be expressed by the inkjet printer, and is output as the print product. The luminance dynamic range of the print product when observed under the standard lighting is narrower than the luminance dynamic range of the raw image data. In contrast, illuminating the output print product using the auxiliary lighting, illumination intensity of which is variable, can reproduce an intrinsic luminance dynamic range that was present at the time of image-capturing.

Figure 5A:
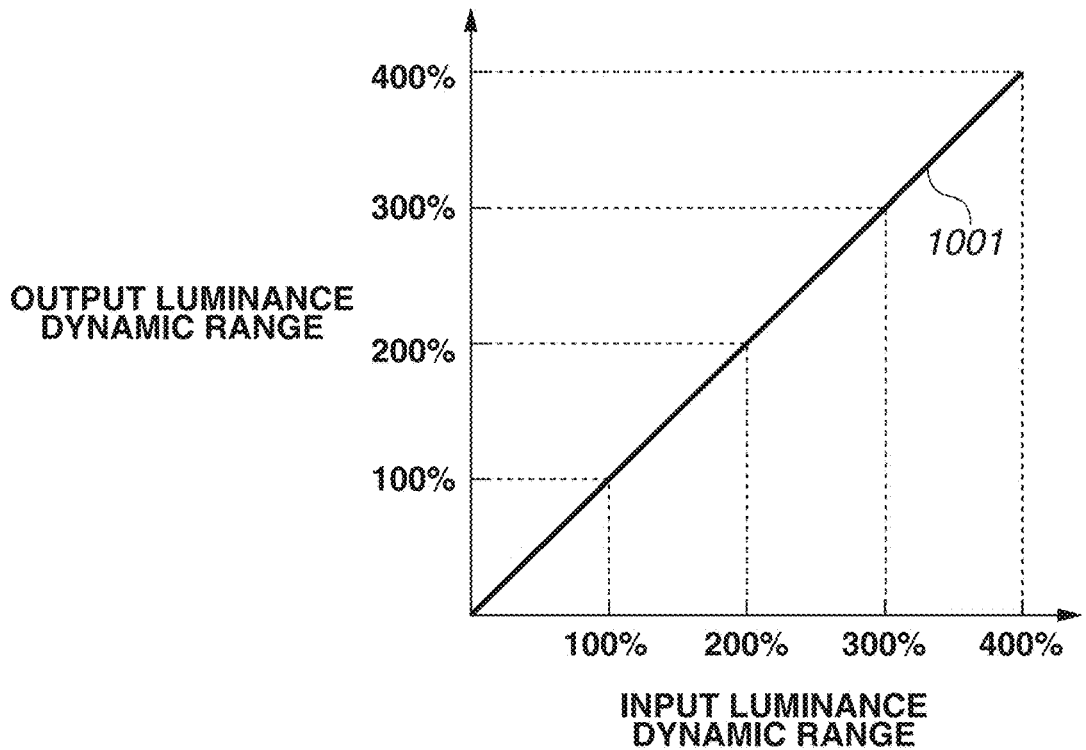
FIGS. 5A and 5B are graphs each illustrating a relationship between an input luminance range and an output luminance range.

With reference to FIG. 5A, a description will be given of a relationship between an input luminance range and an output luminance range in the luminance conversion processing simultaneously performed with the color space conversion pre-processing 301. FIG. 5A illustrates an ideal case in which the input luminance range is linearly converted to the output luminance range. When the output luminance range of the print product can sufficiently express the luminance range of the input data, conversion may be performed such that an output varies linearly with respect to an input as indicated by a solid line 1001 in FIG. 5A. However, a luminance range of a print product, which is a non-luminous material such as paper on which an image is printed, under the standard lighting is typically narrower than the input luminance range. The output luminance on paper, that is, a maximum luminance with respect to paper whiteness is a value determined based on a type of the recording medium and intensity of light with which the print product is illuminated. In a case where a color scheme of the ink jet printer is an sRGB color space, the luminance dynamic range is assumed to be from 0 to 80 cd/m$^2$. Thus, if the luminance range of the input image data is within the range from 0 to 80 cd/m$^2$, processing to make the luminance range unchanged is performed. However, the conversion processing needs to be performed on the input image data, the luminance range of which exceeds the range from 0 to 80 cd/m$^2$, such that the luminance range falls within the luminance dynamic range that can be expressed on the output side, i.e., the recording medium.

Figure 5B:
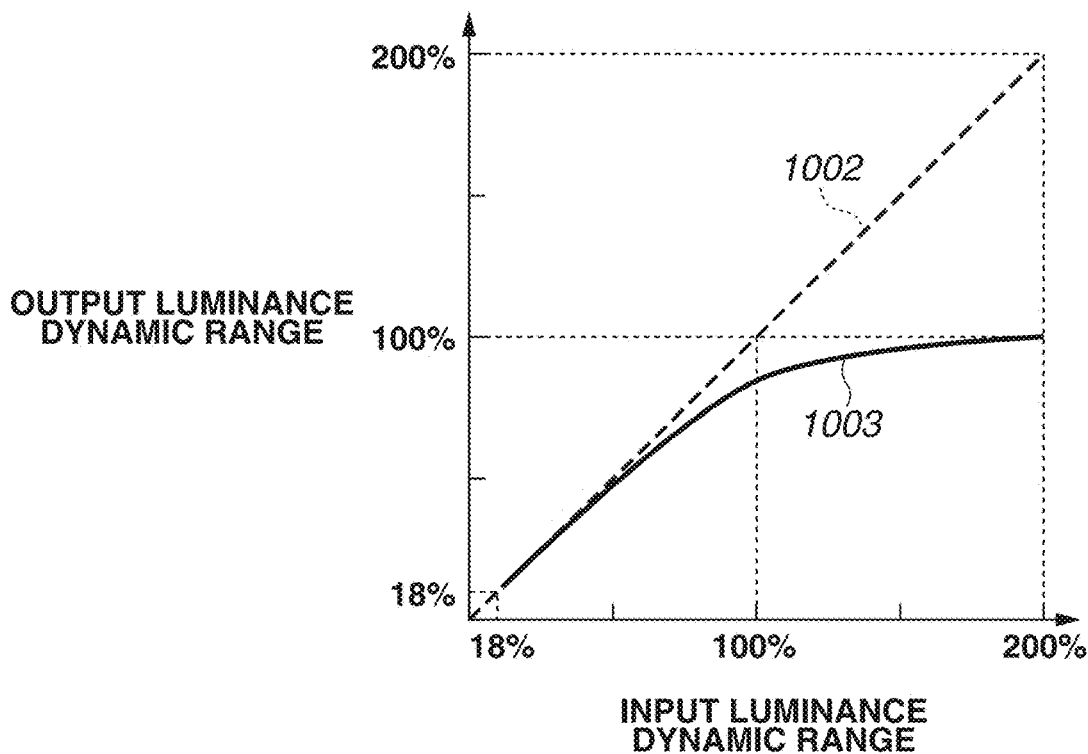

FIG. 5B is a graph illustrating the conversion processing actually performed when an image is printed on a recording medium such as paper, i.e., normal processing assuming that the print product is observed under the standard lighting. FIG. 5B illustrates one example of the luminance conversion (gamma curve) for outputting the input image data, the luminance dynamic range of which is from 0 to 200%, by the inkjet printer. In this case, the conversion processing is performed such that an output varies in a curved manner as indicated by a solid line 1003, instead of a linearly manner as indicated by a broken line 1002.

When an image is output on a recording medium such as non-luminous paper, a maximum value of reflectivity is 100%. Here, luminance of a white background (hereinafter referred to as paper white region) of glossy paper corresponds to the reflectivity of 100%. In the case of sRGB described above, luminance is defined as 80 cd/m$^2$. Thus, the luminance of 80 cd/m$^2$ in the paper white region of glossy paper corresponds to the reflectivity of 100%. In the normal processing assuming that the print product is observed under the standard lighting, the input image data having the dynamic range from 0 to 200% is converted as indicated by the solid line 1003. With respect to reflectivity of 18% gray, which is close to reflectivity of a skin color of the human being, the output luminance is typically maintained at the same level as the luminance of the input image data. Therefore, a gamma curve formed by the solid line 1003 which overlaps with the broken line 1002 in a range from 0 to 18% is typically employed as illustrated in FIG. 5B. The shape of the curve can be changed according to a designer's intention.

[Processing Method]

Processing in the print image generation unit 203 will be described. As described above, using auxiliary illumination by the lighting apparatus when observing the print product enables reproduction of the luminance dynamic range when the input image data is captured. Thus, the present exemplary embodiment is on the premise that the luminance dynamic range that is reproduced by illuminating the print product by the auxiliary lighting is wider than the dynamic range in the case of illuminating the print product by a standard light source having the luminance of 80 cd/m$^2$.

The image data input to the image data input unit 201 of the image processing apparatus 100 is RGB image data acquired by linearly developing raw data that is used in a digital camera or the like of recent years. The raw data is unprocessed image data before a variety of processing is performed on the data in the camera to be converted to JPEG data. The luminance dynamic range of the raw data is wider than the luminance dynamic range of the JPEG data. The raw data is input to the image data input unit 201, while image-capturing information of the raw data such as an exposure condition is input to the image data information input unit 202. The image-capturing information can be received as Exchangeable image file format (Exif) data of the digital camera. The Exif data includes the dynamic range of the image data, and an exposure state when the image data is captured, or a so-called exposure correction value. The present exemplary embodiment assumes the exposure correction value to be a negative value, that is, the image data captured in an underexposure condition.

As described above, the print image generation unit 203 performs the conversion processing on the RGB luminance data, which is the input image data, to convert RGB to XYZ and further convert XYZ to R'G'B' to determine a pixel value of each pixel.

Figure 6A:
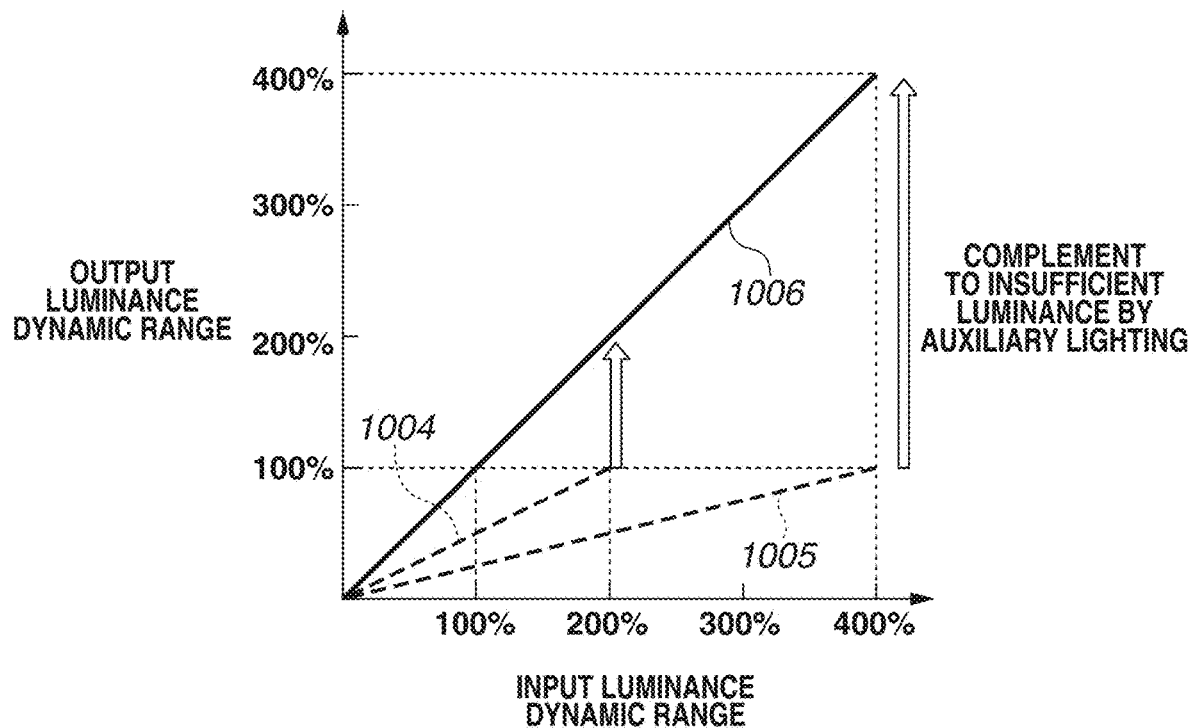
FIGS. 6A and 6B are graphs each illustrating a relationship between an input luminance range and an output luminance range.
Figure 6B:
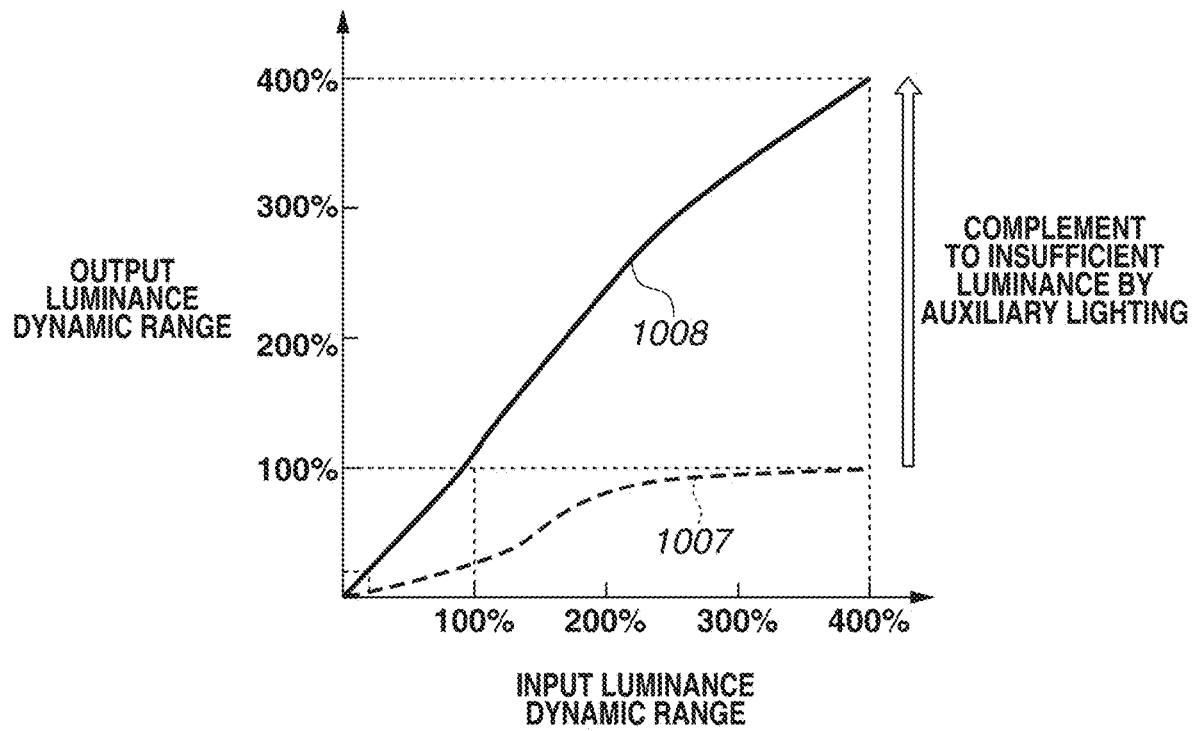

FIGS. 6A and 6B are graphs each illustrating a relationship between the input luminance dynamic range and the output luminance dynamic range in the luminance conversion processing according to the present exemplary embodiment. First, a description will be given of a case in which information input to the image data information input unit 202 is, for example, raw image data having the dynamic range from 0 to 200% and information indicating an exposure correction value=−1, i.e., one stop under proper exposure. In a case where the image is captured with the exposure correction value of −1, the output luminance is converted to be one-half of the input luminance in the case of the proper exposure (i.e., exposure correction value is 0) on the digital camera side. The converted data is then input to the printer. The data input to the printer is data converted such that the luminance value of the output dynamic range is one-half of the luminance value of the input dynamic range at 200%, as illustrated by a broken line 1004 in FIG. 6A. That is, the output luminance dynamic range falls within 100%.

Similarly, in a case where the input data is raw image data having the dynamic range from 0 to 400%, and is captured with the exposure correction value of −2, the output luminance is corrected to be one-quarter of the input luminance on the digital camera side. The converted data is then input to the printer. The data input to the printer is data converted such that the luminance value of the output dynamic range is one-quarter of the luminance value of the input dynamic range at 400%, as illustrated by a broken line 1005 in FIG. 6A. Also in this case, the output luminance dynamic range falls within 100%.

Thus, in either of the two cases, the output luminance is converted to fall within the range from 0 to 100%, which is the luminance that can be reproduced on the printer side. Accordingly, it is not necessary to further narrow the luminance value.

In contrast, when the input image data is raw image data having the luminance dynamic range from 0 to 400%, and information indicating the exposure correction value=−1, i.e., one stop under proper exposure, the data to be input is data, the luminance value of which is one-half of the luminance value of the input dynamic range at 400%. In this case, the luminance value exceeds the luminance value that can be reproduced on the printer side. Thus, the output luminance needs to be converted to fall within the range from 0 to 100% that can be reproduced by the printer. A broken line 1007 in FIG. 6B illustrates data after the conversion on the printer side.

A configuration of the present exemplary embodiment employs the auxiliary lighting to provide illumination, illumination intensity of which is higher than that of the standard lighting assuming luminance of 80 cd/m$^2$. This raises the luminance indicated by the broken line 1004 and that indicated by the broken line 1005 illustrated in FIG. 6A to the luminance indicated by a solid line 1006, and the luminance indicated by the broken line 1007 illustrated in FIG. 6B to the luminance illustrated by a solid line 1008. Thus, in any cases of the broken lines 1004, 1005, and 1007, the print product output on the recording medium, when observed under the standard lighting, appears as a significantly dark image, as compared to the print product output by the normal processing illustrated in FIG. 5B.

As described above, the image processing apparatus 100 receives the raw data linearly developed on the image-capturing device side such as a digital camera, and the information indicating the luminance dynamic range and the negative correction value, which is an exposure condition, as the information when the raw data is captured. Based on the received information, the image processing apparatus 100 performs the conversion processing to convert the luminance within the luminance dynamic range that can be expressed by the image output apparatus 111. The reason that the present exemplary embodiment employs the raw data is that the linear processing can be performed on the raw data, and furthermore, an image having 18% gray is maintained even when the print product is illuminated by the auxiliary lighting so that the image captured with proper exposure of an image-capturing scene can be reproduced. Using the raw data, in which one pixel has a large number of shades of gray ranging from 12 bits to 16 bits, is advantageous in that an image having smooth gradation can be acquired, and degradation of image quality is suppressed.

[Preview Image]

Figure 7A:
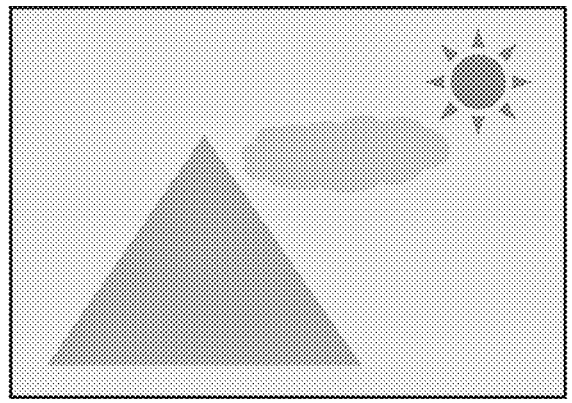
FIGS. 7A to 7C are diagrams each illustrating a preview image.
Figure 7B:
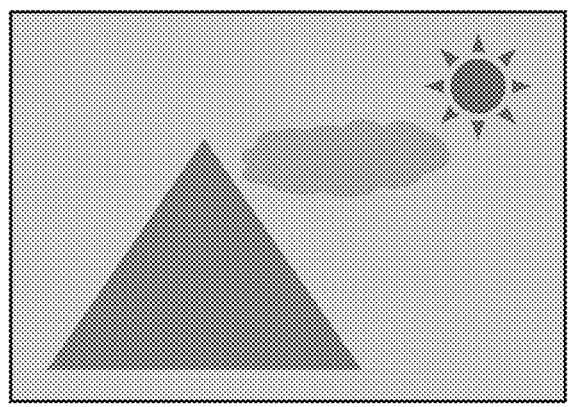
Figure 7C:
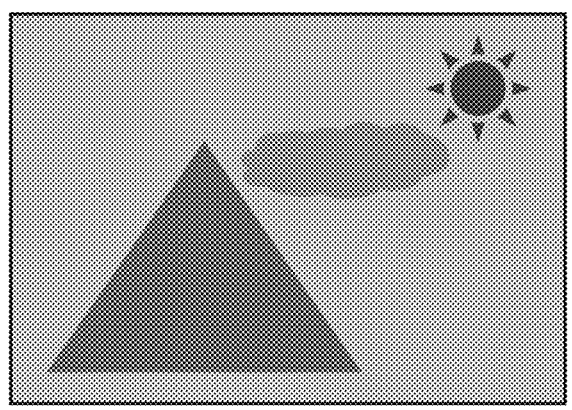

FIGS. 7A to 7C are diagrams each illustrating a preview image. FIG. 7A is a preview image based on image data, the luminance dynamic range of which is up to 100%, and that corresponds to the solid line 1006. This image corresponds to the print product observed under the typical standard lighting, and is an image on which the image processing on the premise of illumination by the auxiliary lighting is not performed. Subsequently, FIG. 7B is an image, on which the image processing is performed on the premise of reproducing the luminance dynamic range of 200% by illuminating the print product by the auxiliary lighting, and that corresponds to the broken line 1004. The image illustrated in FIG. 7B is darker than the image illustrated in FIG. 7A. Finally, FIG. 7C is an image, on which the image processing is performed on the premise of reproducing the luminance dynamic range of 400% by illuminating the print product by the auxiliary lighting, and that corresponds to the broken line 1005. The image illustrated in FIG. 7C is further darker than the image illustrated in FIG. 7B. In can be found that when the image processing to reproduce a wider luminance dynamic range by illuminating the print product by the auxiliary lighting is performed, the wider the luminance dynamic range is, the darker the image to be printed becomes.

Subsequently, a description will be given of a specific relationship example of pieces of luminance data of the respective preview images. Each image displayed on the image display apparatus 112 is typically in a tagged image file format (Tiff), and composed of three planes of R, G, and B. If the image is in a data format of 8-bit depth, the color of one pixel is expressed by R, G, and B, each of which is a combination of values from 0 to 255. Typically, (R, G, B)=(0, 0, 0) expresses black, and (R, G, B)=(255, 255, 255) expresses white. When the data has a greater bit depth, the number of colors (gamut) that can be expressed further increases.

In the print product observed without being illuminated by the auxiliary lighting, i.e., the image, the luminance dynamic range of which is 100%, luminance values of a target pixel A are (R, G, B)=(Kr, Kg, Kb). In contrast, when the luminance dynamic range is 200%, luminance values of the same target pixel A of the image are (R, G, B)=(Kr/2, Kg/2, Kb/2). Similarly, when the luminance dynamic range is 400%, luminance values of the same target pixel A of the image are (R, G, B)=(Kr/4, Kg/4, Kb/4). Since a luminance value should be an integer, if the luminance value is an indivisible number, the luminance value may be replaced with an integer closest to the luminance value. In this manner, the luminance values of each pixel are converted into values calculated based on the luminance dynamic range of the print image, and the luminance values of three planes of R, G, B of the preview image are determined. FIGS. 7A to 7C are the preview images determined by this method.

[Preview Display Method]

Subsequently, a description will be given of a method of, in a case where the luminance dynamic range of the print product is expanded using the auxiliary lighting, displaying a preview image expressed by the expanded luminance dynamic range.

Figure 8A:
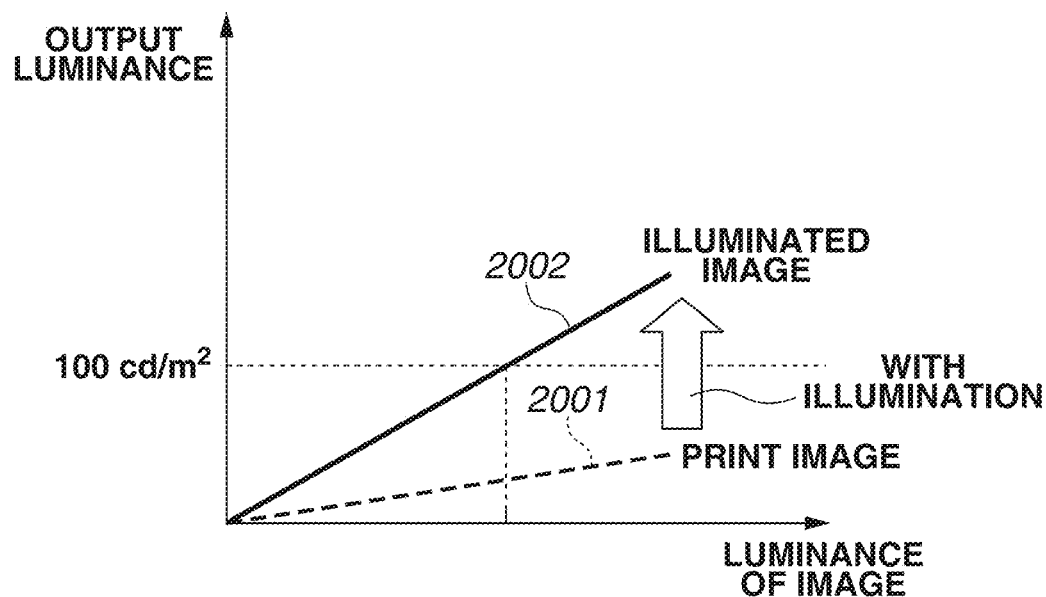
FIGS. 8A and 8B are graphs each illustrating a luminance range of a preview image when a print product is illuminated by lighting.
Figure 8B:
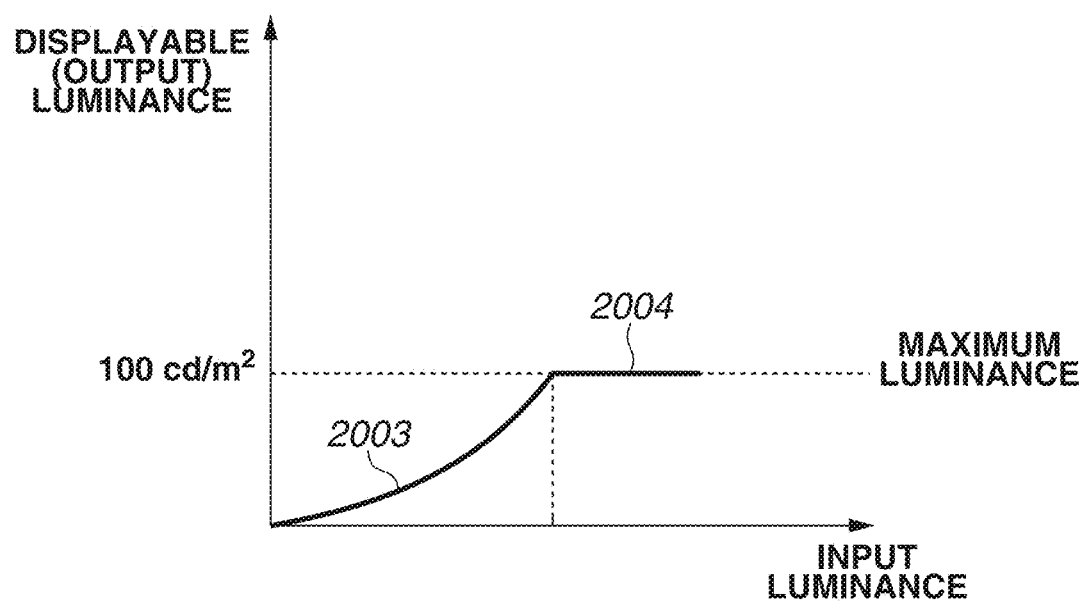

A description will be given of a relationship between the luminance dynamic range of the input image data and performance of an image display apparatus with reference to FIGS. 8A and 8B. In FIG. 8A, a broken line 2001 indicates luminance of image data generated by the printer driver, and a solid line 2002 indicates luminance in a case where the luminance dynamic range is raised by illuminating the print product by the auxiliary lighting. FIG. 8B illustrates luminance values expressed by the image display apparatus in a case where luminance data indicated by the solid line 2002 is input to the image display apparatus having display capability of the maximum luminance being 100 cd/m$^2$. When the luminance data indicated by the solid line 2002 is input to the image display apparatus, the image display apparatus performs normal $\Upsilon$ processing ($\Upsilon$ =2.2) on the luminance data of 100 cd/m$^2$ or less, and displays a result. This is a range indicated by a solid line 2003 illustrated in FIG. 8B. In contrast, for the luminance data exceeding 100 cd/m$^2$, the image display apparatus displays a result acquired by compressing the data to 100 cd/m$^2$ that can be output by the image display apparatus as indicated by a solid line 2004. This means that a difference in luminance in a high luminance region of the displayed image is lost and cannot be expressed. In this manner, when a maximum luminance value of the image data is greater than a maximum luminance value that can be output by the image display apparatus, the image display apparatus does not appropriately display a preview image.

In contrast, according to the present exemplary embodiment, the image processing apparatus 100 acquires display performance of the image display apparatus 112 in advance, and performs compression processing on image data to obtain a range of the luminance dynamic range that can be reproduced by the image display apparatus 112 to generate preview image data. The display performance is specifically the maximum luminance value that can be output by the image display apparatus 112. Consequently, when displaying a preview image of the image data having a luminance value exceeding the maximum luminance value that can be output by the image display apparatus 112, like image data the luminance dynamic range of which is expanded by illuminating the print product by the auxiliary lighting, the image display apparatus 112 can appropriately express a difference in luminance.

A specific processing procedure for a method according to the present exemplary embodiment of displaying a preview image of the print product in a state of being illuminated by the auxiliary lighting will be described with reference to a flowchart illustrated in FIG. 9. In step S101, the image processing apparatus 100 selects a print target image. Subsequently, in step S102, the image processing apparatus 100 analyzes image data of the print target image to acquire a luminance dynamic range. In step S103, the image processing apparatus 100 acquires information (illumination condition) about lighting that illuminates a print product, on which the image data is printed. In step S104, the image processing apparatus 100 calculates a maximum luminance when the print product is illuminated under the illumination condition acquired in step S103. A calculation method here is as described above. Subsequently, in step S105, the image processing apparatus 100 acquires a maximum luminance of the image display apparatus 112 connected to the image processing apparatus 100. Examples of an acquisition method include a method in which a user inputs the maximum luminance read in advance from a specification of the image display apparatus 112 using the input unit 101 and the display unit 102. Alternatively, a method may be employed, in which the maximum luminance is automatically acquired using software (application software) developed based on a software development kit (SDK) provided by a manufacturer of an image display apparatus. Alternatively, as illustrated in FIG. 10, a method may be employed, in which a name of a manufacturer of an image display apparatus, names of its major models (apparatus names), and a maximum luminance that can be output by a corresponding model are stored as table format data in a corresponding manner, and the user instructs to select the maximum luminance through an application at the time of performing print. In step S106, when the maximum luminance that can be output by the image display apparatus 112 is acquired by any one of the methods described above, the image processing apparatus 100 compares the luminance, which is calculated in step S104, of the print product illuminated by the auxiliary lighting, and the maximum luminance that can be output by the image display apparatus 112. In step S107, the image processing apparatus 100 determines a compression processing condition necessary for displaying a preview image of the print product in the state of being illuminated by lighting, based on a result of the comparison made in step S106. Finally, in step S108, the image processing apparatus 100 performs compression processing on the image data under the compression processing condition determined in step S107, and causes the image display apparatus 112 to display a preview image based on the processed data.

Figure 11A:
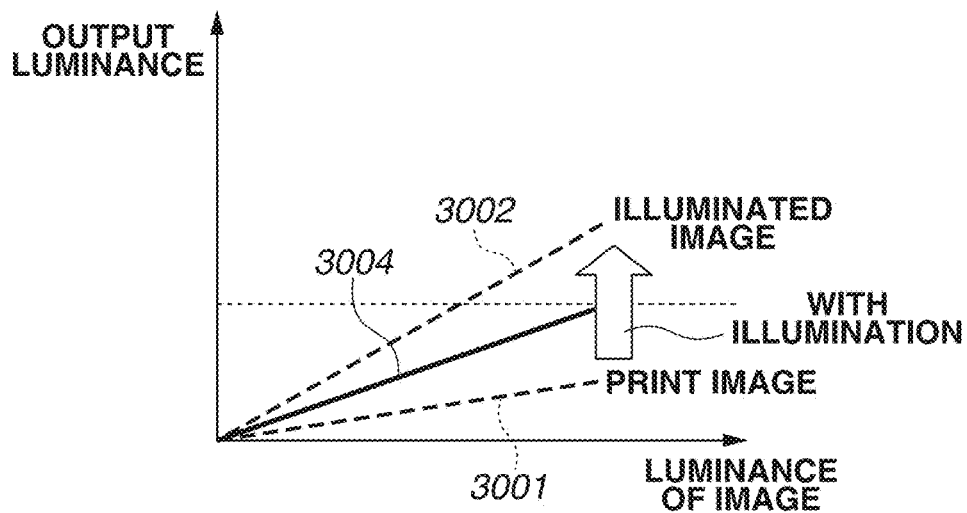
FIGS. 11A to 11C are graphs each illustrating a luminance range of a preview image when a print product is illuminated by lighting.
Figure 11B:
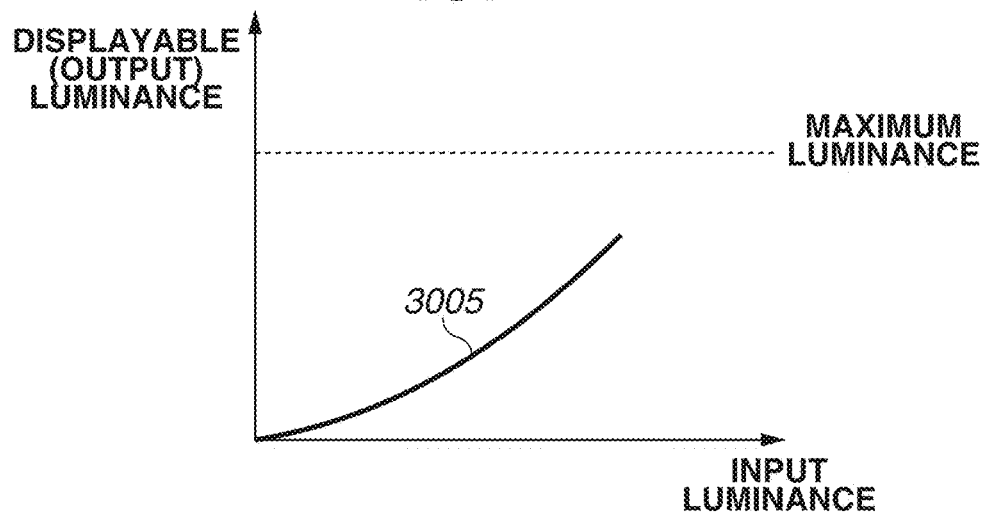
Figure 11C:
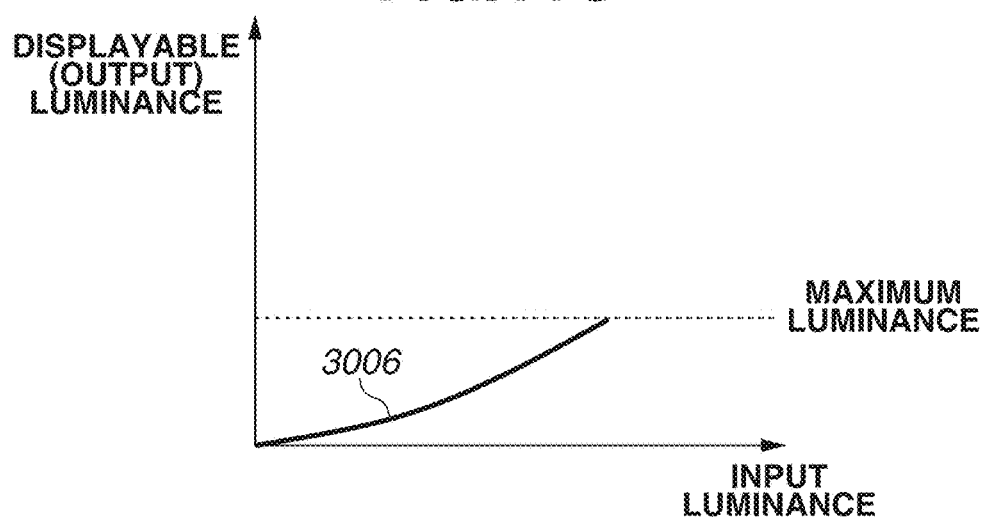

FIG. 11 is a diagram for explaining the compression processing performed on preview image data in step S107 and step S108. FIG. 11A illustrates luminance values of the print product in a broken line 3001 when observed under the standard lighting, and further illustrates luminance values of the print product in a broken line 3002 when observed by illuminating the print product by the auxiliary lighting. In outputting image data having luminance values indicated by the solid line 3004, in a case where a maximum luminance indicated by the solid line 3004 is less than the maximum luminance that can be output by the image display apparatus 112, the image display apparatus 112 can output luminance that can be taken by the image data. In this case, the image data indicated by the solid line 3004 is output to the image display apparatus 112 side without being subjected to the compression processing, and the image display apparatus 112 performs the Y processing (gamma processing). In FIG. 11B, a solid line 3005 indicates luminance values that are displayed at this time. In contrast, when the maximum luminance indicated by the solid line 3004 is greater than the maximum luminance that can be output by the image display apparatus 112, the image display apparatus 112 cannot output all the luminance of the input image data. In this case, as illustrated in FIG. 11C, before the input image data is output to the image display apparatus 112, the print application side performs the compression processing on the luminance data indicated by the solid line 3004 when the print product is illuminated by lighting to covert the luminance data to luminance data indicated by a solid line 3006. At this time, the compression processing is performed such that the maximum luminance value of the luminance data is less than the maximum luminance value that can be output by the image display apparatus 112. Then the luminance data having been subjected to the compression processing is output to the image display apparatus 112. The image display apparatus 112 displays a preview image of the luminance data indicated by the solid line 3006. At this time, an output luminance value output by the image display apparatus 112 increases in the entire range that can be taken by the input luminance values. That is, the high luminance region also has gradation characteristics, and the preview image can be appropriately expressed without losing a difference in luminance.

As described above, the image processing apparatus 100 according to the present exemplary embodiment calculates luminance data for a case where the print product is illuminated by the auxiliary lighting and determines whether the maximum luminance of the calculated luminance data is greater than the maximum luminance that can be output by the image display apparatus 112. In a case where the maximum luminance of the calculated luminance data exceeds the maximum luminance value of the image display apparatus 112, the image processing apparatus 100 performs the compression processing on the calculated luminance data. This method enables appropriate expression of a difference in luminance in the high luminance region in displaying a preview image in a case where the product is illuminated by the auxiliary lighting, and display of an image having gradation characteristics.

Figure 12:
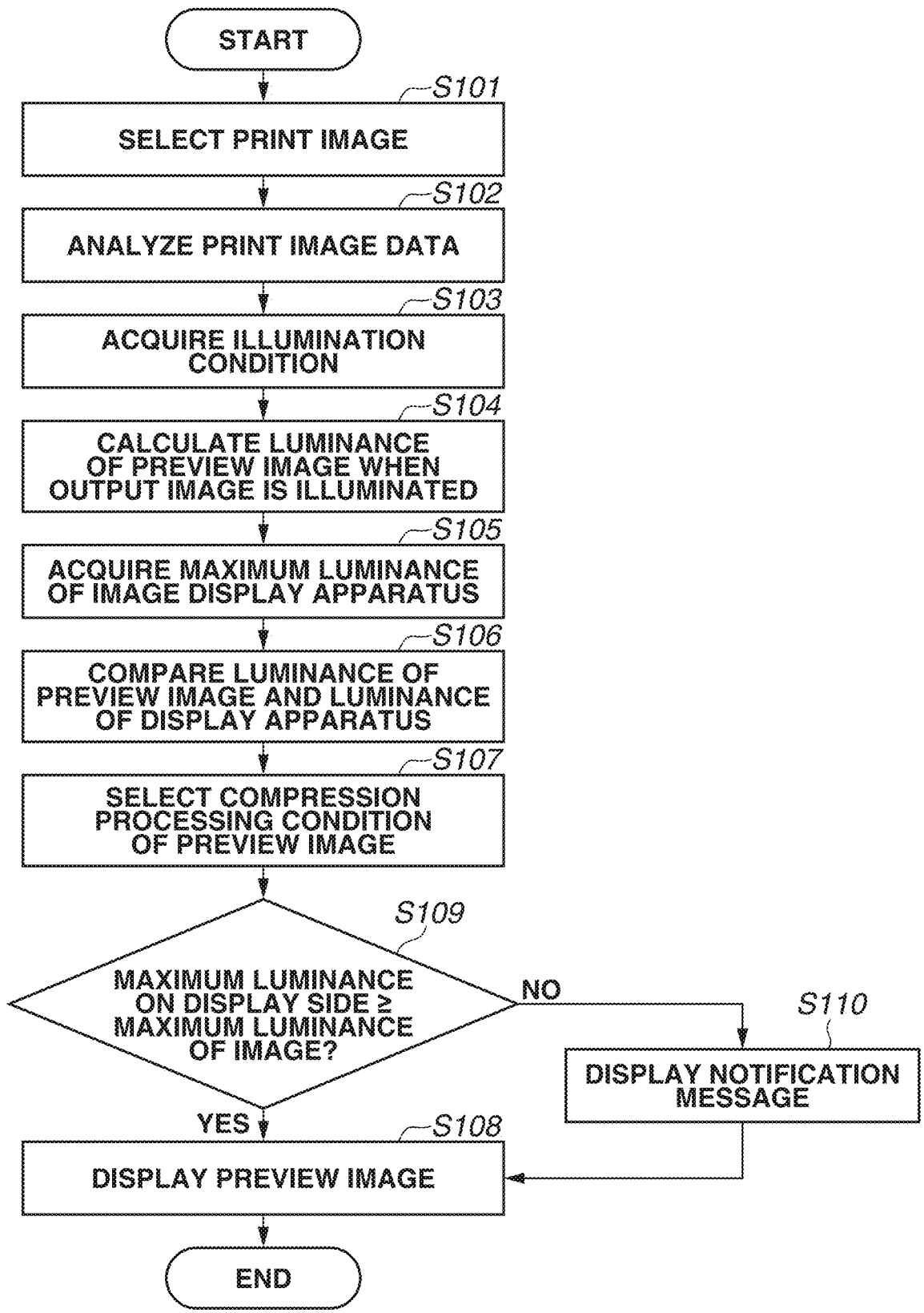
FIG. 12 is a flowchart of preview display processing according to the first exemplary embodiment.

Other examples of the processing illustrated in FIG. 9 will be described with reference to FIGS. 12 and 13. FIG. 12 is a flowchart of processing to which a step of notifying the user of the compression processing to be performed is added, and steps S109 and S110 are added to the flow illustrated in FIG. 9. In step S109, the image processing apparatus 100 compares the maximum luminance of the acquired preview image and the maximum luminance that can be output by the image display apparatus 112. If the maximum luminance that can be output by the image display apparatus 112 is greater than the maximum luminance of the acquired preview image (YES in step S109), the processing proceeds to step S108. In contrast, if the maximum luminance that can be output by the image display apparatus 112 is less than the maximum luminance of the acquired preview image (NO in step S109), the processing proceeds to step S110. In step S110, the image processing apparatus 100 causes the display unit 102 or the image display apparatus 112 to display a notification message notifying the user that the preview image cannot be displayed with the originally intended luminance value. Then the processing proceeds to step S108.

Figure 13:
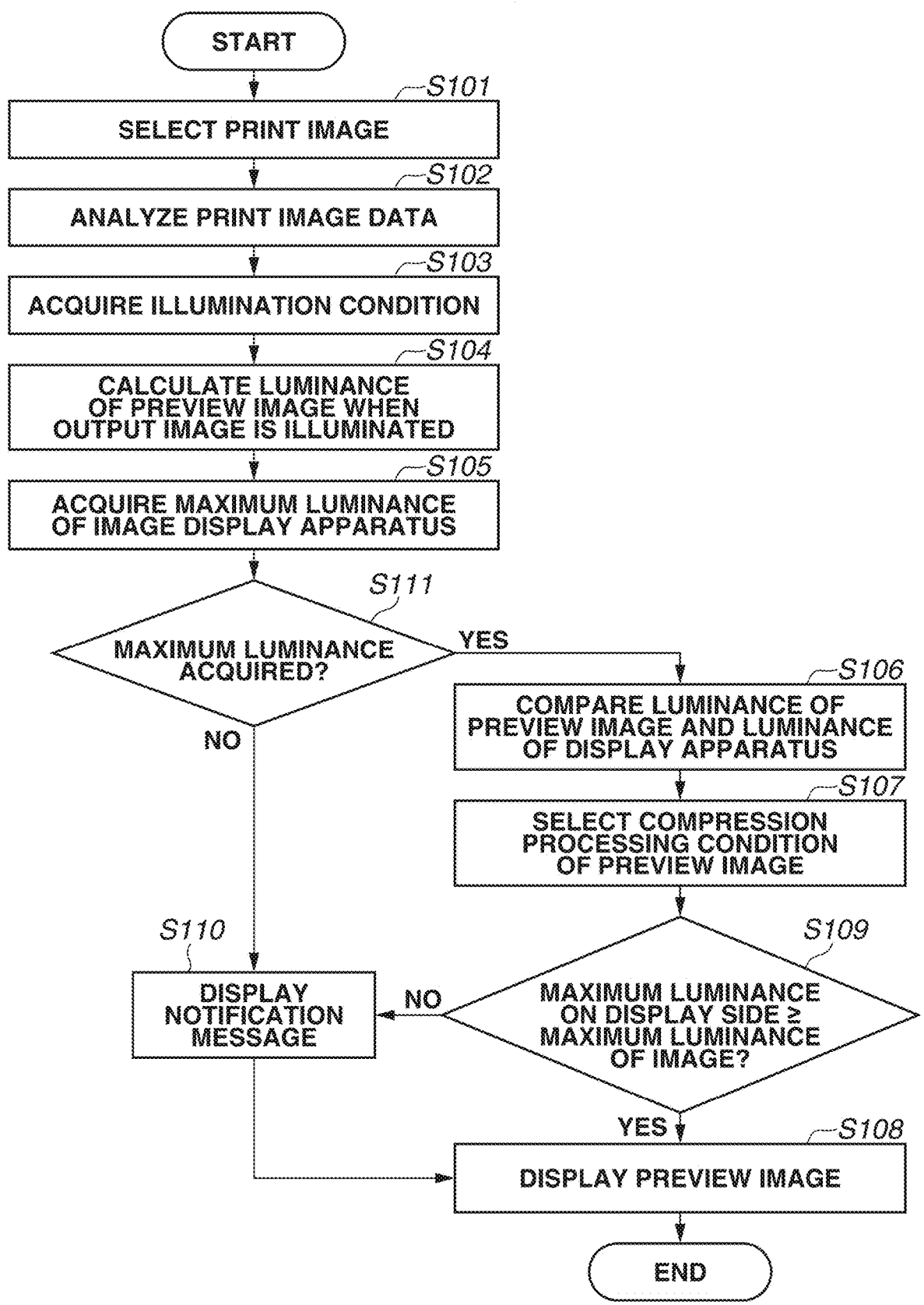
FIG. 13 is a flowchart of preview display processing according to the first exemplary embodiment.

On the other hand, in an example illustrated in FIG. 13, in a case where the image processing apparatus 100 cannot acquire the maximum luminance that can be output by the image display apparatus 112, the image processing apparatus 100 does not perform the processing in steps S106, S107, and S109 of the flowchart. In step S110, the image processing apparatus 100 causes the image display apparatus 112 to display a massage indicating, for example, "The maximum luminance that can be output by the image display apparatus is unavailable. The luminance value of the preview image may be incorrect". In addition, according to the flowchart in FIG. 13, the luminance data of the preview image to be displayed is transmitted to the image display apparatus 112 without being subjected to the compression processing. After the processing in step S110 is performed, the processing proceeding to step S108.

It is preferable that the acquired maximum luminance value of the image display apparatus 112 and characteristics of the recording medium on which the image is printed be factored in values used when the compression processing is performed on the illuminated image data. For example, results obtained by illuminating the print product on which a gradation pattern is printed, changing a luminance value, and measuring reflection characteristics can be stored to determine values used for the compression processing based on the results.

Mobile/portable personal computers (PCs) of recent years come with a photography function, an image processing function, and an image display function. Installing software (application software) corresponding to the printer driver on the mobile/portable PC enables transmission of print data to a print apparatus through a wireless function. Needless to say, the mobile/portable PC, which comes with the image display function, can automatically recognize display capability such as the maximum luminance. Therefore, when displaying a preview image of the illuminated image, the mobile/portable PC can automatically acquire the maximum luminance of the image display apparatus 112.

In a second exemplary embodiment, a description will be given of an example in which raw image data serving as input image data is input from the image-capturing apparatus, and the image processing apparatus 100 performs gamma correction. As described above, the raw image data is image data that is acquired by the image-capturing apparatus such as a digital camera, that has not been subjected to processing such as correction, and that has a resolution with the number of bits greater than 8 bits of data in the JPEG format. Data in a color displayed on a normal PC display is comprised of a combination of R, G, and B that are light's three primary colors. In the case of JPEG data, the data includes information of each color having 8 bits (eighth power of 2=256 shades of gray), and can express approximately 16,670,000 colors, which are the third power of 256 shades of gray (256 shades of gray in R×256 shades of gray in G×256 shades of gray in B). In the case of raw data, on the other hand, the data with each color of R, G, and B having 10 bits can express the tenth power of 2=1,024 shades of gray per color and approximately 1,064,330,000 colors, which are the third power of 1,024 shades of gray in a combination of the three colors. In recent years, high dynamic range (HDR) displays that can support these numbers of shades of gray are available to the market, and are expected to increase with the advancement in technology in the future.

Figure 14A:
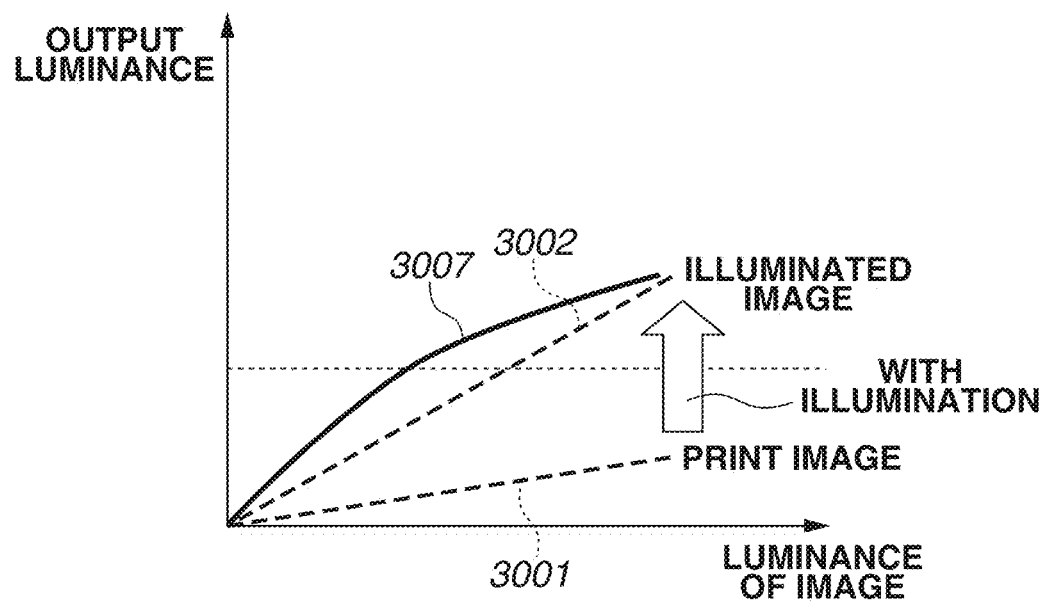
FIGS. 14A and 14B are graphs each illustrating a luminance range of a preview image when raw image data is used, according to a second exemplary embodiment.
Figure 14B:
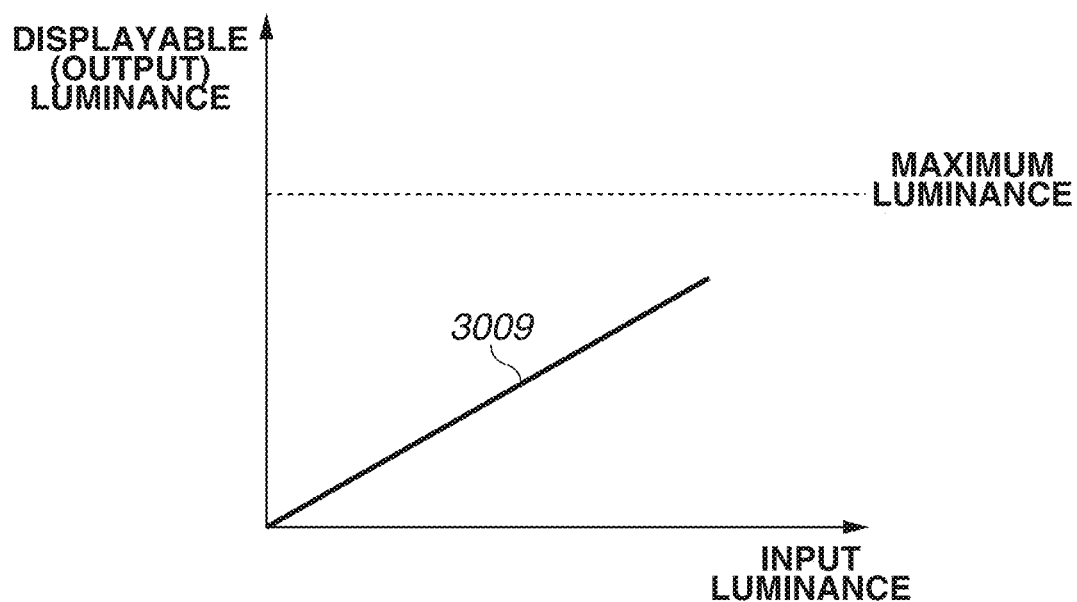

A description will be given below of processing performed in steps S107 and S108 in FIG. 9 in a case where raw data is used in the image processing apparatus 100. FIGS. 14A and 14B are graphs each illustrating the compression processing using raw image data, in a case where a luminance range displayable by the image display apparatus is sufficiently wider than a luminance range of a preview image to be displayed. In the same manner as the first exemplary embodiment, the image processing apparatus 100, using a print application, generates illuminated image data assuming a case where a print product is illuminated by the auxiliary lighting from print image data indicated by the broken line 3001. At this time, data indicated by the broken line 3002 is acquired by linearly increasing the luminance by an amount corresponding to illumination by the auxiliary lighting, according to the first exemplary embodiment. In the present exemplary embodiment, on the other hand, raw image data, which has not been subjected to processing by the image-capturing unit, is used, so that gamma characteristics, in addition to the maximum luminance displayable by the image display apparatus 112, is taken into consideration as illustrated in FIG. 14A. As indicated by a solid line 3007, the image processing apparatus 100 outputs data, as illuminated image data having been subjected to the gamma correction, to the image display apparatus 112. The image display apparatus 112, which has received the illuminated image data, displays a preview image, output luminance of which has been linearly converted with respect to input luminance by the gamma processing, as illustrated in FIG. 14B.

Figure 15A:
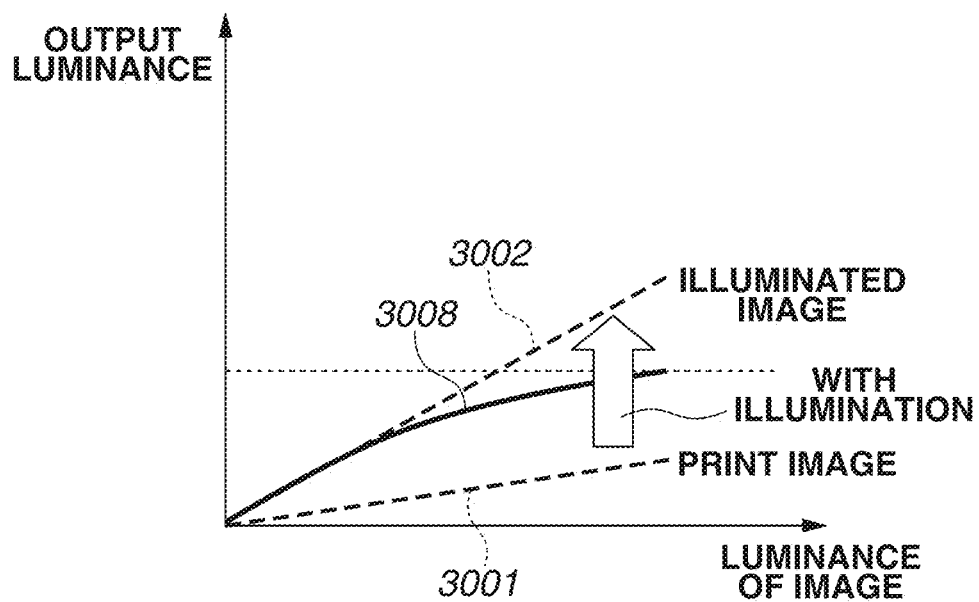
FIGS. 15A and 15B are graphs each illustrating a luminance range of a preview image when raw image data is used, according to the second exemplary embodiment.
Figure 15B:
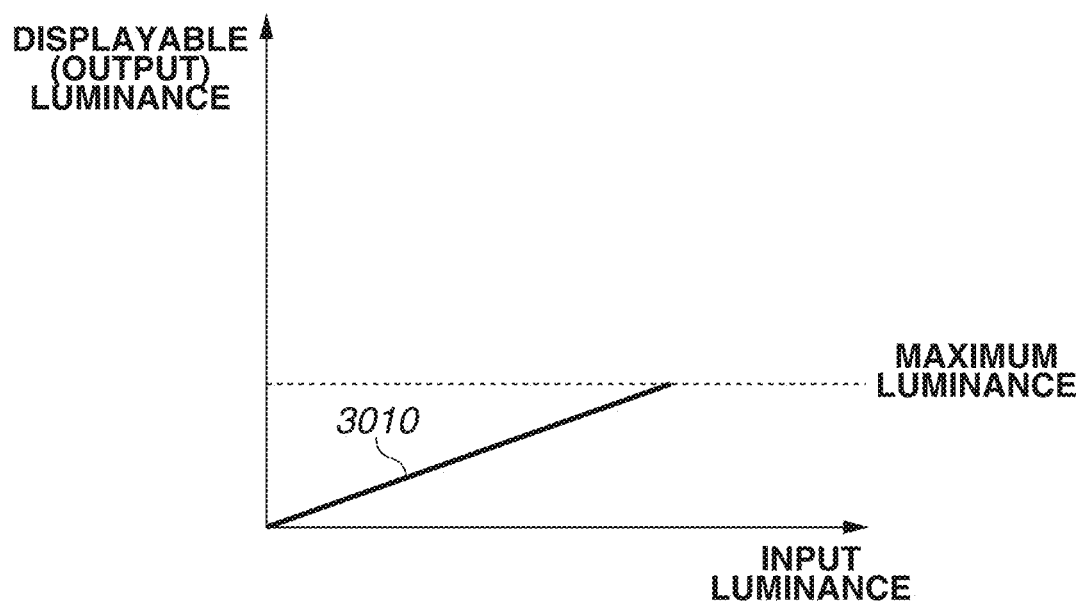

Subsequently, FIGS. 15A and 15B are graphs each illustrating the compression processing when a luminance range displayable by the image display apparatus 112 is narrower than a luminance range of a preview image to be displayed. In FIG. 15A, a solid line 3008 indicating illuminated image data corresponds to data having been subjected to the gamma processing in consideration of the maximum luminance displayable by the image display apparatus 112 and the gamma characteristics. When the illuminated image data is output from the image processing apparatus 100 to the image display apparatus 112, the image display apparatus 112 performs the gamma processing. As illustrated in FIG. 15B, the image display apparatus 112 displays a preview image, in which output luminance has been linearly converted to a sold line 3010 with respect to input luminance, and a difference in luminance in the high luminance region in the luminance range displayable by the image display apparatus 112 is appropriately expressed.

Most of typical liquid crystal displays are designed with a gamma value being "2.2". Thus, the inverse "1/2.2" of the gamma value "2.2" may be used for the gamma correction on the image processing apparatus side.

Figure 16:
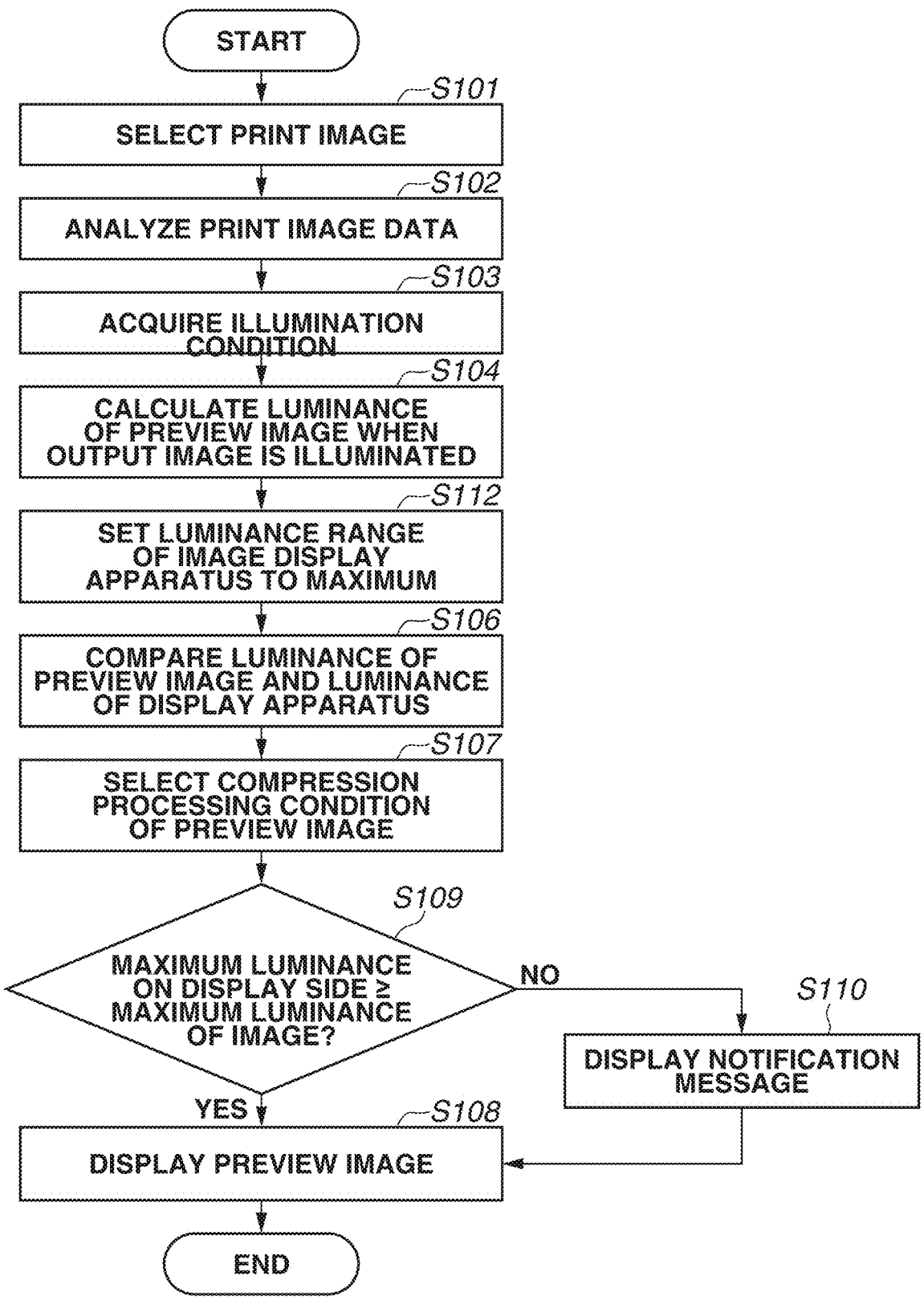
FIG. 16 is a flowchart of preview display processing according to a third exemplary embodiment.

A third exemplary embodiment is based on the premise that the image display apparatus 112 connected to the image processing apparatus 100 is configured such that a luminance range can be automatically set from the outside. FIG. 16 is a flowchart illustrating image processing according to the present exemplary embodiment. The present exemplary embodiment employs software (application software) developed based on an SDK provided by a manufacturer of an image display apparatus. This flowchart is provided with, instead of step S105 in FIG. 9 of acquiring the maximum luminance of the image display apparatus 112, step S112 of setting a luminance range of the image display apparatus 112 connected to the image processing apparatus 100 to the maximum at the time of displaying a preview image assuming that the print product is illuminated by the auxiliary lighting. The same processing as that is performed in the exemplary embodiments described above is performed in the same manner in the subsequent steps. The configuration described above allows the preview image to be reproduced in a state closer to the print product illuminated by lighting. When the luminance range of the image display apparatus 112 is automatically operated, e.g., when the user intentionally changes a set value, processing to automatically return the changed setting to the original setting at the time of completion of displaying the preview image may be performed.

Other Exemplary Embodiment

In the exemplary embodiments described above, the description has been given of the example in which the raw data is input as the input image data, and the image processing is performed using the exposure correction value of the Exif data as the image-capturing condition. The reason for using the raw data is that a total of 24 bit colors, each color of R, G, and B having 8 bits, is insufficient for the original image in a case where image combining is to be performed, and one purpose thereof is to avoid degradation of image quality due to occurrence of a round off error in the fractions at the time of the image combining. In response to this issue, a concept of performing the image combining using color data having 24 bits or greater has been proposed in recent years. This concept is called high-dynamic-range rendering, and an image format that can handle color data having 24 bits or greater is collectively called a high-dynamic-range image (HDRI). Among HDRIs, a configuration may be employed, in which JPEG-HDR data (capable of storing 32-bit color in maximum while maintaining compatibility with conventional JPEG) in the HDRI file format developed by Dolby Laboratories, Inc. is used, instead of the raw data.

While the description has been given of the example in which input image data and the information about the image-capturing condition are directly input from the image-capturing apparatus such as a camera to the image processing apparatus 100, the present invention is not limited to this configuration. For example, a configuration may be employed, in which the image processing apparatus 100 accepts an input of the image data and the information about the image-capturing condition from a storage medium such as a memory card.

With this configuration, a preview image can be appropriately displayed even when the luminance dynamic range is widened by illuminating the print product by the lighting apparatus, and the maximum luminance thereof exceeds the maximum luminance of the image display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120451, filed Jun. 27, 2019, which is hereby incorporated by reference herein in its entirety.

What is claimed is:

1. An image processing apparatus, comprising:
a processor; and
a memory coupled to the processor storing instructions that, when executed by the processor, cause the processor to function as:
a print processing unit configured to receive an image data to be output to a printing apparatus for printing a print product, and to receive illumination condition data of a lighting apparatus;
an acquisition unit configured to acquire a first value indicating a maximum luminance value of the print product illuminated by the lighting apparatus based on the image data and the illumination condition data, and
a second value indicating a maximum luminance value displayable by an image display apparatus;
a generation unit configured to generate preview image data to be displayed on the image display apparatus by converting the image data based on the first value and the second value; and
an output unit configured to output the generated preview image data to the image display apparatus,
wherein, in a case where the first value is greater than the second value, the generation unit generates the preview image data so that a maximum luminance value of the preview image data is less than or equal to the second value.

2. The image processing apparatus according to claim 1, wherein the first value is acquired based on information indicating a medium type of the print product.

3. The image processing apparatus according to claim 1, wherein the image data is generated based on high-dynamic-range (HDR) data acquired by an image-capturing unit, and the first value is acquired based on a maximum luminance value of the image data and the illumination condition data.

4. The image processing apparatus according to claim 1, wherein the generation unit, in a case where the first value is greater than the second value, generates the preview image data by performing compression processing on the image data.

5. The image processing apparatus according to claim 1, wherein the maximum luminance value of the preview image data generated by the generation unit is the second value.

6. The image processing apparatus according to claim 1, further comprising an input unit configured to receive input image data from an image-capturing apparatus or a storage medium,
wherein the obtaining unit is configured to obtain the image data by performing processing of narrowing a luminance dynamic range on the input image data.

7. The image processing apparatus according to claim 6, wherein the input image data is raw image data or Joint Photographic Experts Group high-dynamic-range (JPEG-HDR) data.

8. The image processing apparatus according to claim 6, wherein the input image data is captured by the image-capturing apparatus under an exposure condition in which an exposure correction value is a negative value.

9. The image processing apparatus according to claim 1, wherein the acquisition unit is configured to acquire information indicating the second value by an input from a user.

10. The image processing apparatus according to claim 1, wherein the acquisition unit is configured to accept information about an apparatus type of the image display apparatus from a user, and acquire the second value based on the acquired information.

11. The image processing apparatus according to claim 10, further comprising a storage unit configured to store the information about the apparatus type of the image display apparatus and the second value in association with each other.

12. An image processing method, comprising:
receiving an image data to be output to a printing apparatus for printing a print product, and receiving illumination condition data of a lighting apparatus;
acquiring a first value indicating a maximum luminance value of the print product illuminated by the lighting apparatus based on the image data and the illumination condition data, and a second value indicating a maximum luminance value displayable by an image display apparatus;

generating preview image data to be displayed on the image display apparatus by converting the image data based on the acquired first and second values; and outputting the generated preview image data to the image display apparatus, wherein, in a case where the first value is greater than the second value, the generation unit generates the preview image data so that a maximum luminance value of the preview image data is less than or equal to the second value.

13. A non-statutory storage medium storing a program to cause a computer to execute an image processing method, the method comprising:

receiving an image data to be output to a printing apparatus for printing a print product, and receiving illumination condition data of a lighting apparatus;

acquiring a first value indicating a maximum luminance value of the print product illuminated by the lighting apparatus based on the image data and the illumination condition data, and a second value indicating a maximum luminance value displayable by an image display apparatus;

generating preview image data to be displayed on the image display apparatus by converting the image data based on the acquired first and second values; and outputting the generated preview image data to the image display apparatus, wherein, in a case where the first value is greater than the second value, the generation unit generates the preview image data so that a maximum luminance value of the preview image data is less than or equal to the second value.

14. The non-statutory storage medium according to claim 13, wherein the first value is acquired based on information indicating a medium type of the print product.

15. The non-statutory storage medium according to claim 13, wherein the image data is generated based on high-dynamic-range (HDR) data acquired by an image-capturing unit, and the first value is acquired based on a maximum luminance value of the image data and the illumination condition data.

16. The non-statutory storage medium according to claim 13, wherein the generating, in a case where the first value is greater than the second value, generates the preview image data by performing compression processing on the image data.

17. The image processing method according to claim 12, wherein the first value is acquired based on information indicating a medium type of the print product.

18. The image processing method according to claim 12, wherein the image data is generated based on high-dynamic-range (HDR) data acquired by an image-capturing unit, and the first value is acquired based on a maximum luminance value of the image data and the illumination condition data.

19. The image processing method according to claim 12, wherein the generating, in a case where the first value is greater than the second value, generates the preview image data by performing compression processing on the image data.

20. The image processing apparatus according to claim 1, wherein the generation unit generates the preview image data so that a difference in luminance in a high luminance region is expressed.

21. The image processing method according to claim 12, wherein the preview image data is generated so that a difference in luminance in a high luminance region is expressed.

* * * * *